United States Patent Office 3,780,020
Patented Dec. 18, 1973

3,780,020
ERYTHROMYCIN AZINE DERIVATIVES
Delme Evans, Chalfont St. Peter, England, assignor to
Lilly Industries Limited, London, England
No Drawing. Filed Sept. 27, 1971, Ser. No. 184,223
Claims priority, application Great Britain, Sept. 30, 1970,
46,402/70
Int. Cl. C07c 129/18
U.S. Cl. 260—210 E          3 Claims

ABSTRACT OF THE DISCLOSURE

Erythromycin azine derivatives are useful in the treatment of bacterial, amoebic and trichomonal infections in mammals and birds, and are prepared by reacting erythromycin hydrazone or erythromycin B hydrazone with an appropriate ketone or aldehyde.

---

This invention relates to pharmaceutical compositions comprising certain azine derivatives of erythromycin which have been found to possess useful pharmacological action. The invention also provides a group of novel azine derivatives of use in the compositions of the present invention and a process whereby said novel azines may be prepared.

According to the present invention therefore, there are provided pharmaceutical compositions comprising at least one azine compound of the formula:

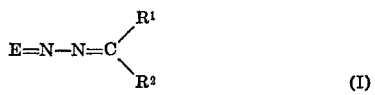

wherein E represents the 9-deoxy-erythromycin or erythromycin B nucleus, and either $R^1$ represents hydrogen or $C_{1-6}$ alkyl and $R^2$ represents $C_{1-6}$ alkyl, $C_{3-7}$ alkoxycarbonylalkyl, phenyl or a 5-membered heterocyclic ring (as hereinafter defined), the phenyl being optionally substituted by nitro, halogen, $C_{1-4}$ alkyl or $C_{1-4}$ alkoxy, or $R^1$ and $R^2$ together with the adjacent carbon represent $C_{3-7}$ cycloalkylidene, in association with a pharmaceutically acceptable carrier or diluent therefor.

By the term "$C_{1-6}$ alkyl" as used herein is meant saturated straight or branched chain alkyl groups containing up to 6 carbon atoms, exemplary of which are methyl, ethyl, n.propyl, isopropyl, n.butyl, isobutyl, s.butyl, t.butyl, n.pentyl, s.pentyl, isopentyl, n.hexyl, 2-ethylbutyl, 4-methylpentyl and 2-isopropyl-propyl. Similarly the term "$C_{1-4}$ alkyl" means the aforementioned alkyl groups having up to 4 carbon atoms and the term "$C_{1-4}$ alkoxy" means a $C_{1-4}$ alkyl group linked through an oxygen atom, exemplary of which are methoxy, ethoxy, isopropoxy, n-butoxy, s.butoxy and t.butoxy. The term "$C_{3-7}$ alkoxycarbonylalkyl" means the aforementioned alkoxy groups linked to an alkyl substituent through a carbonyl, the resultant substituent having a total of from 3 to 7 carbons. Examples of $C_{3-7}$ alkoxycarbonylalkyl are methoxycarbonylmethyl, ethoxycarbonylmethyl, methoxycarbonylethyl, methoxycarbonylbutyl, ethoxycarbonylpropyl, ethoxycarbonylbutyl, t.butoxycarbonylmethyl and s.butoxycarbonylethyl. The term "$C_{3-7}$ cycloalkylidene" as used herein means saturated cyclic alkyl groups containing from 3 to 7 carbon atoms, i.e. cyclopropylidene, cyclobutylidene, cyclopentylidene, cyclohexylidene and cycloheptylidene groups. The term "5-membered heterocyclic ring" as used herein means a ring of the formula:

wherein $R^3$ is hydrogen, nitro, halogen, $C_{1-4}$ alkyl or $C_{1-4}$ alkoxy substituent, X is N or CH and Y is S, O or $NR^4$ where $R^4$ is hydrogen, $C_{1-4}$ alkyl, $C_{2-4}$ alkoxyalkyl, phenyl or benzyl.

As stated above, the compounds of Formula I possess useful pharmacological action. In particular they are useful as antibiotics, being active both in vitro and in vivo against gram-positive organisms. Thus, in vitro using the gradient plate technique, the compounds of Formula I possess MIC's (minimum inhibitory concentrations) against *Staphylococcus aureus* 6718 and U125 of from 0.1 to 8.0 μg./ml. and against *Streptococcus faecalis* 8213 of from 0.5 to 8.0 μg./ml. By in vivo tests in mice against *Streptococcus pyogenes* C203, the compounds of Formula I have been shown to possess $ED_{50}$'s of from 25 to 80 mg./kg. by the oral route and from 2 to 5 mg./kg. by the subcutaneous route.

The compounds of Formula I also possess useful amoebicidal activity, being from 55 to 100% effective against *Entamoeba histolytica* in rats following 5 doses of 300 mg./kg.

In addition to the foregoing activities, certain of the compounds of Formula I, especially where $R^2$ is phenyl, possess moderately useful antitrichomonal activity, being from 50 to 60% effective against *Trichomonas vaginalis* at a dose of 60 mg./kg. i.p.

Accordingly, the compounds of Formula I may be used for treating bacterial, amoebic and trichomonal infections in mammals and birds caused by various organisms. When so employed, the compounds of Formula I will normally be administered in dosages ranging from 0.5 to 3 g. per day. The compounds may be administered orally, parenterally or rectally in composition form, the oral route being preferred. As stated previously, the compositions of the present invention comprise at least one compound of Formula I in association with a pharmaceutically acceptable carrier or diluent therefor. The active ingredient may be mixed with a carrier, or diluted by a carrier, or enclosed or encapsulated by a carrier in the form of a capsule or other container. A diluent may be a solid, semi-solid or liquid material which serves as a vehicle, excipient or medium for the active ingredient. Some examples of diluents or carriers which may be employed in the compositions of the present invention are lactose, dextrose, sucrose, sorbitol, starch, gum acacia, liquid paraffin, oil of theobroma, tragacanth, gelatin, methyl cellulose and methyl- and propyl-hydroxybenzoate. In the case of tablets, a lubricant such as talc, mineral oil or aluminium, magnesium or calcium stearate may be incorporated.

Preferred compositions for use in the treatment of humans are tablets, capsules and similar dosage unit forms, each dosage unit normally containing from about 50 to 500 mg. of a compound of Formula I.

The compounds of Formula I may also be used to control the growth of staphylococci and streptococci present on equipment, furnishings, walls and floors in dental and medical offices, surgeries and hospitals. For such use, the compositions of the present invention will normally comprise the active ingredient dissolved or suspended in an aqueous carrier, advantageously together with a suitable surface active agent. The carrier may of course also be a commercially available disinfectant preparation on which the compound of Formula I confers greater bactericidal action.

Certain of the compounds of Formula I are novel and accordingly form a part of this invention. The novel compounds are those of Formula I in which E is as defined above and either $R^1$ represents hydrogen or $C_{1-6}$ alkyl and $R^2$ represents $C_{3-7}$ alkoxycarbonylalkyl, phenyl or a 5-membered heterocyclic ring (as hereinbefore defined), the phenyl being optionally substituted by nitro, halogen, $C_{1-4}$ alkyl or $C_{1-4}$ alkoxy, or $R^1$ and $R^2$ together with the adjacent carbon represents $C_{3-7}$ cycloalkylidene.

Within the above group of novel compounds, there is a preferred class wherein E represents 9-deoxyerythromycin and and either $R^1$ represents hydrogen or $C_{1-4}$ alkyl (especially methyl) and $R^2$ represents $C_{3-4}$ alkoxycarbonylalkyl (especially ethoxycarbonylmethyl), phenyl, nitrophenyl, tolyl, chlorophenyl or a heterocyclic ring of Formula II in which X and Y are as defined above, $R^3$ is hydrogen, nitro, methyl or chloro and $R^4$ is hydrogen, $C_{1-4}$ alkyl, $C_{2-4}$ alkoxyalkyl or benzyl, or $R^1$ and $R^2$ together with the adjacent carbon represent cyclopentylidene or cyclohexylidene (especially the latter).

The novel compounds of this invention may be prepared by conventional methods for the preparation of azines. The preferred method for use in the preparation of the compounds of this invention comprises reacting erythromycin hydrazone or erythromycin B hydrazone with a ketone or aldehyde of the formula:

wherein $R^1$ and $R^2$ are as defined above. The reaction may be carried out in conventional manner by reacting the hydrazone and compound of Formula III in the presence or absence of a suitable reaction solvent such as chloroform or toluene and at a suitable reaction temperature such as between 20 and 100° C. or at the reflux temperature of the solvent when one is present.

As examples of novel compounds of this invention which may be prepared in accordance with the foregoing process, there may be named the erythromycin and erythromycin B azines with ethylacetoacetate, ethyllaevulate, ethylbutan-3-one-2-carboxylate, benzaldehyde, acetophenone, 4-nitrobenzaldehyde, 2-nitrobenzaldehyde, 4 - nitroacetophenone, o - tolualdehyde, p - tolualdehyde, 4-methylpropiophenone, 3,4-dichlorobenzaldehyde, 4-bromobenzaldehyde, 4-chlorobenzaldehyde, 4-chloroacetophenone, 5-nitrothiophen - 2 - aldehyde, 3-aceto-5-nitrothiophen, thiophen-2-aldehyde, furfuraldehyde, 5-nitrofurfuraldehyde, pyrrole-2-aldehyde, 1-methylpyrrole-2-aldehyde, 1-methylimidazole-2-aldehyde, 1-n.-butylimidazole-2-aldehyde, 1-methoxymethylimidazole-2-aldehyde, 1-ethoxyethylimidazole-2-aldehyde, 1 - methyl-2-aceto-5-nitroimidazole, 1-benzylimidazole-2-aldehyde, 1-benzylimidazole-5-aldehyde, cyclopentanone and cyclohexanone.

Exemplary of other compounds of Formula I which are of use in accordance with the present invention are the erythromycin and erythromycin B azines with acetone, ethyl methyl ketone, methyl isopropyl ketone, t.butyl methyl ketone and pentan-3-one.

In addition to possessing utility as pharmaceuticals, the novel compounds of Formula I are also useful as intermediates in that they can be hydrogenated in good yield to the corresponding erythromycylamines. Accordingly a feature of the present invention is the provision of a method for preparing erythromycylamine or erythromycyl B amine comprising catalytically hydrogenating a novel compound of Formula I, especially one in which either $R^1$ is hydrogen and $R^2$ is phenyl or substituted phenyl or $R^1$ and $R^2$ together represent cycloalkyl, at a hydrogen pressure of from 50 to 3000 p.s.i. in a suitable inert solvent. Such solvents include water, aqueous alcohol and acid solvents such as acetic acid. Suitable catalysts are the noble metal catalysts such as platinum, palladium, rhodium, ruthenium and the like, either as the free metal or oxide or supported on charcoal. The most preferred catalyst in accordance with this invention is 10% ruthenium on charcoal, the use of which gives yields of over 60% in the hydrogenation of, for example, erythromycin azines with cyclohexanone and p-tolualdehyde.

The following examples will further illustrate the various aspects of the present invention:

(1) PHARMACEUTICAL COMPOSITIONS OF THE INVENTION

In the following examples of pharmaceutical compositions of use in the present invention, the "medicament" referred to is the erythromycin azine with acetophenone. That compound may of course be replaced by an equivalent amount of any other compound of Formula I.

Example 1

Tablets each containing 250 mg. of the medicament are made as follows:

| | Mg. per tablet |
|---|---|
| Medicament | 250.0 |
| Starch | 73.0 |
| Lactose | 50.0 |
| Ethyl cellulose (as 20% solution in industrial alcohol) | 5.0 |
| Alginic acid | 14.0 |
| Magnesium stearate | 3.0 |
| Talc | 5.0 |
| Total | 400.0 |

The medicament, starch and lactose are passed through a 44-mesh B.S.S. sieve and mixed thoroughly. The solution of ethyl cellulose is mixed with the resultant powders which are then passed through a 12-mesh B.S.S. sieve. The granules produced are dried and then sieved through a 16-mesh B.S.S. screen. The alginic acid, magnesium stearate and talc, previously sieved through a 60-mesh B.S.S. screen, are added to the granules, mixed and compressed in a tableting machine to yield tablets containing 250 mg. of medicament.

Example 2

Capsules each containing 250 mg. of medicament are made as follows:

| | Mg. per capsule |
|---|---|
| Medicament | 250 |
| Lactose | 238 |
| Magnesium stearate | 2 |

The medicament, lactose and magnesium stearate are sieved through a 44-mesh B.S.S. screen and filled into hard gelatin capsules.

Example 3

Injection solutions containing 50 mg. of medicament are made as follows:

A 0.5% w./v. solution of medicament is prepared in distilled water and filtered through a bacteria proof filter into a sterile container. 10 ml. quantities (i.e. 50 mg. of medicament) are distributed aseptically into sterile ampoules which are then hermetically sealed under aseptic conditions.

Example 4

Suppositories each containing 500 mg. of medicament are made by sieving the medicament through a 60-mesh B.S.S. screen and suspending it in theobroma oil previously melted using the minimum of heat necessary. The mixture is then poured in a suppository mould of nominal 2 g. capacity and allowed to cool.

(2) PREPARATION OF NOVEL COMPOUNDS OF THE INVENTION

Example 5

Erythromycin hydrazone (10.0 g.) and acetophenone (11 ml.) were heated on a steam bath for 7 hours. The excess of acetophenone was distilled under reduced pressure and the residue recrystallised successively from aqueous ethanol and chloroform. The resultant erythromycin azine with acetophenone had M.P. 132–5° C. and was pure by thin layer chromatography.

*Analysis.*—Found (percent): C, 63.4; H, 8.7; N, 4.8. $C_{45}H_{75}N_3O_{12}$ requires (percent): C, 63.6; H, 8.8; N, 4.9.

Example 6

Erythromycin B hydrazone (10.0 g.) was reacted as in Example 5 to yield erythromycin B azine with acetophenone, the product being pure by thin-layer chromatography.

Example 7

Erythromycin hydrazone (3.75 g.) and 4-nitroacetophenone (0.83 g.) in chloroform (75 ml.) were heated under reflux for 4 days. The chloroform was evaporated and the residue recrystallised successively from chloroform/petroleum ether (B.P. 60–80° C.) and aqueous ethanol. The resultant erythromycin azine with 4-nitroacetophenone had M.P. 143–7° C. and was pure by thin-layer chromatography.

Analysis.—Found (percent): C, 60.1; H, 8.4; N, 6.2. $C_{45}H_{74}N_4O_{14}$ requires (percent): C, 60.4; H, 8.3; N, 6.0.

Example 8

Erythromycin hydrazone (3.0 g.) and cyclohexanone (15 ml.) were stirred at room temperature for 6 hours and at 100° C. for 1½ hours. The excess of cyclohexanone was removed under reduced pressure and the residue recrystallised from chloroform/petroleum ether (B.P. 60–80° C.). The solid obtained was chromatographed on Woelm neutral alumina (Grade 2, 70 g.) to yield erythromycin azine with cyclohexanone, M.P. 130–3° C., which was pure by thin-layer chromatography.

Analysis.—Found (percent): C, 62.1; H, 9.5; N, 5.2. $C_{43}H_{77}N_3O_{12}$ requires (percent): C, 62.4; H, 9.3; N, 5.1.

Example 9

A solution of erythromycin hydrazone (1.5 g.) and p-nitrobenzaldehyde (0.3 g.) in toluene (50 ml.) was refluxed for 18 hours. The solvent was evaporated and the residue recrystallised from aqueous ethanol. The resultant erythromycin azine with p-nitrobenzaldehyde, M.P. 145–7° C., was pure by thin layer chromatography.

Analysis.—Found (percent): C, 59.8; H, 8.2; N, 6.2, $C_{44}H_{72}N_4O_{14}$ requires (percent): C, 60.0; H, 8.2; N, 6.4.

Example 10

Erythromycin B hydrazone was reacted as in Example 9 to yield erythromycin B azine with p-nitrobenzaldehyde which was pure by thin-layer chromatography.

Example 11

A solution of erythromycin hydrazone (5.0 g.) and p-tolualdehyde (2 ml.) in toluene (100 ml.) was heated under reflux for 60 hours. The water which formed was removed in a Dean and Stark apparatus. Evaporation of the toluene under reduced presure yielded a residue which crystallised from ethanol to give erythromycin azine with p-tolualdehyde M.P. 128–132° C. which was pure by thin-layer chromatography.

Example 12

Using one of the methods given in Examples 5 to 11, the following erythromycin azines were prepared. All were pure by thin-layer chromatography and gave satisfactory analyses. Because of some decomposition prior to melting in respect of these compounds, melting points are only given where decomposition did not occur to any substantial extent:

Erythromycin azine with thiophen-2-aldehyde, M.P. 155–151° C.
Erythromycin azine with 1-n.butylimidazole-2-aldehyde M.P. 124–7° C.
Erythromycin B azine with 1-n.butylimidazole-2-aldehyde
Erythromycin azine with ethyl acetoacetate, M.P. 99–104° C.
Erythromycin azine with 1-benzylimidazole-5-aldehyde, M.P. 130–5° C.
Erythromycin azine with 5-nitrothiophen-2-aldehyde, M.P.≃138° C. (dec.)
Erythromycin B azine with 5-nitrothiophen-2-aldehyde
Erythromycin azine with 1-methoxymethylimidazole-2-aldehyde, M.P. 136–40° C.
Erythromycin azine with p-chlorobenzaldehyde, M.P. 144–7° C.
Erythromycin B azine with p-chlorobenzaldehyde
Erythromycin azine with 1-methylpyrrole-2-aldehyde M.P. 134–8° C.
Erythromycin B azine with pyrrole-2-aldehyde
Erythromycin azine with pyrrole-2-aldehyde, M.P. 141–4° C.

(3) REDUCTION OF NOVEL COMPOUNDS OF THE INVENTION TO THE CORRESPONDING ERYTHROMYCYLAMINES

Example 13

The azine of Example 8 (500 mg.) was dissolved in warm ethanol (30 ml.) and diluted with water (20 ml.). 10% ruthenium on charcoal (500 mg.) was added and the mixture hydrogenated at 2200 p.s.i. for 16 hours at 60° C. The solution was cooled, filtered and concentrated to half its original volume, diluted with an equal volume of water and then extracted with chloroform. The pH of the aqueous solution was adjusted to pH 8.5 with 2 N sodium hydroxide, and extracted three times with chloroform (total volume 75 ml.). Evaporation of the latter gave a white solid which, on recrystallisation from ether, gave erythromycylamine M.P. 125–6° C. in 60% yield.

Example 14

Using the method of Example 13, the azines of Examples 9, 10 and 11 were reduced respectively to erythromycylamine (yield 50%), erythromycyl B amine (40%) and erythromycylamine (60%).

I claim:

1. A compound of the formula $$E=N-N=C\begin{matrix}R^1\\R^2\end{matrix}\qquad(I)$$

wherein E represents the 9-deoxy-erythromycin or 9-deoxy-erythromycin B nucleus, and $R^1$ separately represents hydrogen or $C_{1-6}$ alkyl, $R^2$ separately represents $C_{3-7}$ alkoxycarbonylalkyl, phenyl, substituted phenyl in which the substituent is nitro, bromo, chloro, $C_{1-4}$ alkyl or $C_{1-4}$ alkoxy; or a 5-membered heterocyclic ring of the formula:

$$\begin{matrix}N-\\ \| \quad \|-R^3\\ \diagdown Y \diagup\end{matrix}\qquad(II)$$

wherein $R^3$ is hydrogen, nitro, chloro, bromo, $C_{1-4}$ alkyl or $C_{1-4}$ alkoxy; X is N or CH and Y is S, O or $NR^4$ where $R^4$ is hydrogen, $C_{1-4}$ alkyl, $C_{2-4}$ alkoxyalkyl or benzyl; and $R^1$ and $R^2$ when taken together with the carbon atom to which they are attached represent $C_{3-7}$ cycloalkylidene.

2. Compound as claimed in claim 1, wherein E represents 9-deoxy-erythromycin, $R^1$ separately represents hydrogen of $C_{1-4}$ alkyl, $R^2$ separately represents $C_{3-4}$ alkoxycarbonylalkyl, phenyl, nitrophenyl, tolyl, chlorophenyl, or a five-membered heterocyclic ring of the formula $$\begin{matrix}X-\\ \| \quad \|-R^3\\ \diagdown Y \diagup\end{matrix}$$

wherein X is N or CH, Y is S, O or $NR^4$, $R^3$ is hydrogen, nitro, methyl or chloro and $R^4$ is hydrogen, $C_{1-4}$ alkyl, $C_{2-4}$ alkoxyalkyl or benzyl; and $R^1$ and $R^2$ when together with the carbon atom to which they are attached represent cyclopentylidene or cyclohexylidene.

3. A compound according to claim 1 represented by the formula $$E=N-N=Q$$

wherein E represents the 9-deoxy-erythromycin nucleus, and Q is α-methylbenzylidene, cyclohexylidene, p-chlorobenzylidene, p-methylbenzylidene, 5-nitrophenylidene, 1-methoxymethylimidazole carboxylidene and 1-benzylimidazolecarboxylidene.

References Cited

UNITED STATES PATENTS 3,478,014  11/1969  Djokic et al. _____ 260—210 E
3,660,376  5/1972   Massey _____ 260—210 E JOHNNIE R. BROWN, Primary Examiner U.S. Cl. X.R.

424—181

PO-1050
(5/69)

UNITED STATES PATENT OFFICE
CERTIFICATE OF CORRECTION

Patent No. 3,780,020                    Dated December 18, 1973

Inventor(s) Delme Evans

It is certified that error appears in the above-identified patent and that said Letters Patent are hereby corrected as shown below:

Column 3, line 1, "represents" should read --represent--.

Column 3, line 5, one "and" should be removed.

Column 5, line 65, under Example 12, the line should read --161°C.--.

Column 6, line 50-55, in the formula, the "N" in the 5-membered ring should be --X--.

Signed and sealed this 17th day of September 1974.

(SEAL)
Attest:

McCOY M. GIBSON JR.
Attesting Officer

C. MARSHALL DANN
Commissioner of Patents